US008396655B2

(12) United States Patent
Breuer et al.

(10) Patent No.: US 8,396,655 B2

(45) Date of Patent: Mar. 12, 2013

(54) MOTOR VEHICLE CONTROL SYSTEM

(75) Inventors: Karsten Breuer, Lauenau (DE); Thomas Dieckmann, Pattensen (DE); Hartmut Kitterer, Neu-Ulm (DE)

(73) Assignee: WABCO GmbH, Hannover (DE)

( * ) Notice: Subject to any disclaimer, the term of this patent is extended or adjusted under 35 U.S.C. 154(b) by 412 days.

(21) Appl. No.: 12/733,491

(22) PCT Filed: Jul. 17, 2008

(86) PCT No.: PCT/EP2008/005818

§ 371 (c)(1), (2), (4) Date: Apr. 28, 2010

(87) PCT Pub. No.: WO2009/033521

PCT Pub. Date: Mar. 19, 2009

(65) Prior Publication Data

US 2010/0256867 A1 Oct. 7, 2010

(30) Foreign Application Priority Data

Sep. 6, 2007 (DE) ......................... 10 2007 042 481

(51) Int. Cl.
*G06F 19/00* (2011.01)

(52) U.S. Cl. ........ 701/408; 701/32.2; 701/33.4; 701/45; 701/48; 701/117; 701/118; 701/300; 701/301; 701/469; 701/470; 340/435; 340/438; 340/439; 340/901; 340/903; 342/70; 342/71; 342/357.31; 342/451; 342/458; 348/149; 348/169; 382/104; 702/159; 250/201.6; 356/3.03

(58) Field of Classification Search ................ 701/1, 23, 701/24, 32.2, 33.4, 45, 48, 117, 118, 300, 701/301, 302, 408, 469, 470, 514; 340/435, 340/438, 439, 901, 903, 905, 933, 936, 937, 340/945, 995.12, 995.13; 342/70, 71, 357.31, 342/451, 458; 348/149, 169; 382/104; 702/159; 250/201.6; 356/3.03

See application file for complete search history.

(56) References Cited

U.S. PATENT DOCUMENTS

| | | | | |
|---|---|---|---|---|
| 6,226,389 | B1 | 5/2001 | Lemelson et al. | |
| 6,574,538 | B2 | 6/2003 | Sasaki | |
| 6,675,074 | B2 * | 1/2004 | Hathout et al. | 701/1 |
| 6,757,085 | B1 * | 6/2004 | Halldorsson | 359/13 |
| 6,879,890 | B2 | 4/2005 | Matsumoto et al. | |
| 7,205,888 | B2 | 4/2007 | Isaji et al. | |
| 2002/0022927 | A1 | 2/2002 | Lemelson et al. | |

(Continued)

FOREIGN PATENT DOCUMENTS

| | | | |
|---|---|---|---|
| DE | 199 01 200 | A1 | 7/2000 |
| DE | 100 62 406 | A1 | 6/2002 |

(Continued)

*Primary Examiner* — McDieunel Marc

(74) *Attorney, Agent, or Firm* — Kramer Levin Naftalis & Frankel LLP

(57) ABSTRACT

A control system for a motor vehicle includes: (a) at least one driving data sensor for acquiring driving data characterizing a driving state of the motor vehicle; (b) at least one camera for capturing images of the surroundings; (c) an accident recorder that can record the images of the surroundings in a buffer; and (d) an electronic controller for controlling the driving data sensor, the camera, and the accident recorder. The electronic controller is programmed to trigger an autonomous braking action of the motor vehicle based on driving data and/or images of the surroundings.

10 Claims, 1 Drawing Sheet

U.S. PATENT DOCUMENTS

| | | | | |
|---|---|---|---|---|
| 2009/0125181 | A1 | 5/2009 | Luke et al. | |
| 2010/0019963 | A1 * | 1/2010 | Gao et al. | 342/357.04 |

FOREIGN PATENT DOCUMENTS

| | | | |
|---|---|---|---|
| DE | 20 2004 012 886 | U1 | 12/2004 |
| DE | 10 2004 058 037 | A1 | 7/2005 |
| DE | 10 2004 033 589 | A1 | 2/2006 |
| DE | 10 2004 058 251 | A1 | 6/2006 |
| DE | 10 2006 010 866 | A1 | 9/2006 |
| DE | 602 08 798 | T2 | 9/2006 |
| DE | 10 2006 060 457 | A1 | 8/2007 |
| DE | 10 2010 062 841 | A1 | 6/2012 |
| EP | 1 588 910 | A1 | 10/2005 |
| GB | 2 268 608 | A | 1/1994 |
| JP | 244932 | | 9/1998 |
| JP | 2002042288 | | 2/2002 |
| JP | 2002230696 | | 8/2002 |
| JP | 2004054875 | | 2/2004 |
| JP | 2006120137 | | 5/2006 |
| JP | 2007199791 | | 8/2007 |
| WO | WO 2006/092361 | A1 | 9/2006 |

* cited by examiner

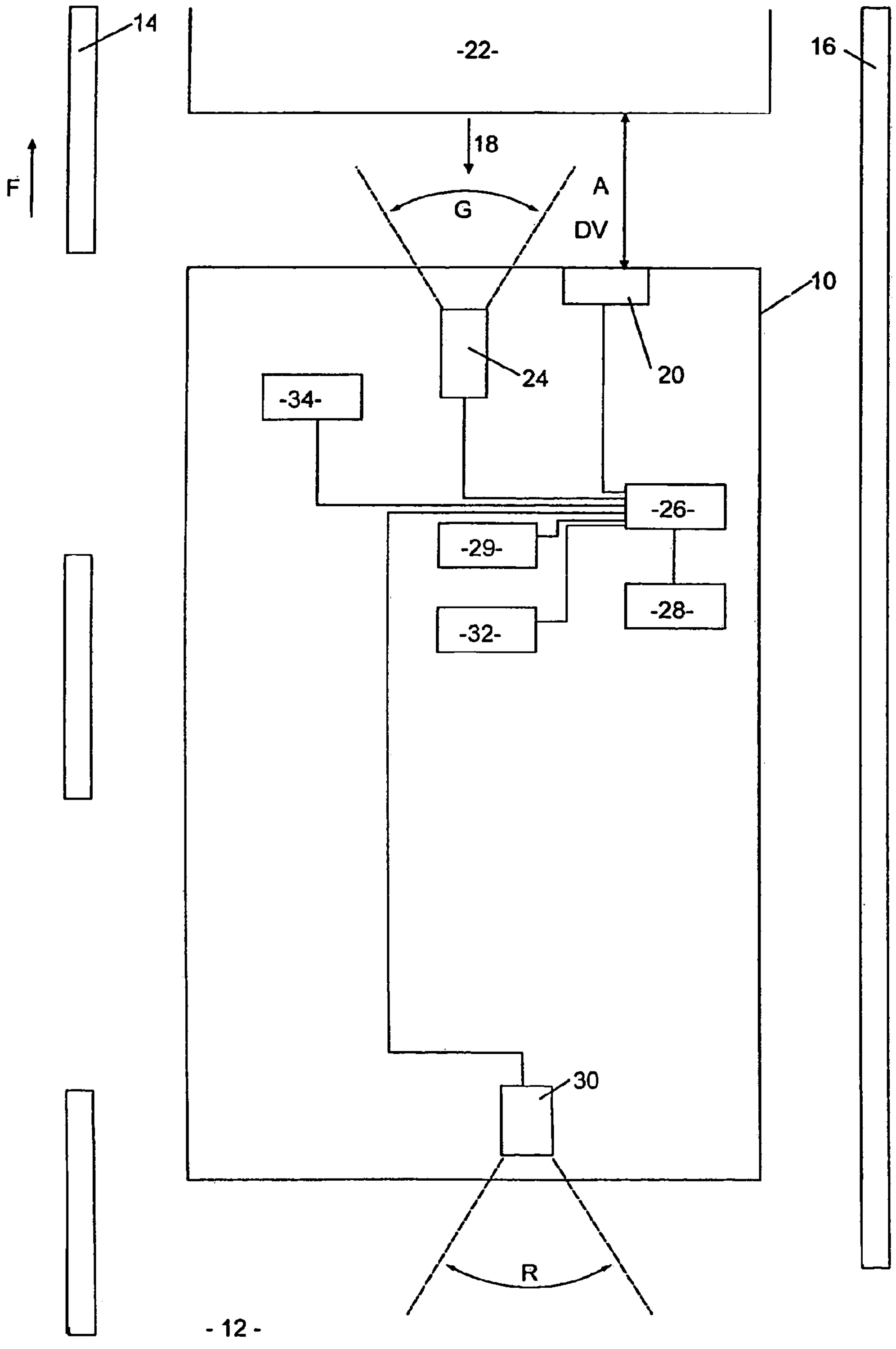
14
-22-
16
18
F
G
A
DV
10
24
20
-34-
-26-
-29-
-28-
-32-
30
R
- 12 -

MOTOR VEHICLE CONTROL SYSTEM

FIELD OF THE INVENTION

The present invention generally relates to embodiments of a vehicle control system and method for a motor vehicle having at least one driving data sensor for detection of driving data that characterize a driving state of the vehicle, at least one camera for detection of surrounding-area images, an accident data recorder for buffered recording of the surrounding-area images, and an electronic controller for controlling the driving data sensor, the camera and the accident data recorder.

BACKGROUND OF THE INVENTION

A system of the general type under consideration is described in DE 199 01 200 A1 and is used to store image data for evidential purposes in the event of an accident. The system described in this reference has the disadvantage that it can be used only for evidence security.

It is also generally known to install driver assistance systems in motor vehicles. Driver assistance systems are used to reduce the severity of an accident by autonomous partial braking of a motor vehicle, for example of a commercial vehicle, shortly before the collision, or to reduce the severity of an accident, or to completely avoid an accident by autonomous full braking before an obstruction when an escape maneuver is no longer possible. A distance sensor, for example, is provided as a driving data sensor for this purpose, and determines the distance to a preceding vehicle.

Furthermore, driver assistance systems typically include a camera that is associated with a lane-keeping assistant. The camera has a field of view that covers the area in which driving lane markings can be seen on a roadway during normal operation of the motor vehicle. The lane-keeping assistant uses image evaluation software to identify whether the motor vehicle is leaving its lane, and, if appropriate, warns the driver.

SUMMARY OF THE INVENTION

Generally speaking, it is an object of the present invention to provide a vehicle control system having an electronic controller adapted to initiate autonomous braking of the motor vehicle based on driving data and/or surrounding-area images. It is a further object of the present invention to provide a method including the steps of determining whether predetermined driving data and/or surrounding-area images are present, and initiating autonomous braking of the motor vehicle based thereon.

In accordance with embodiments of the present invention, advantageously, the camera can provide both images for the accident data recorder and for a driver assistance system, for example a lane-keeping or braking assistance system, which prevents accidents or reduces their consequences by braking the vehicle autonomously, that is, without any driver action. This means that there is no need for an additional braking assistance system camera. By way of example, the electronic controller can also be part of the driver assistance system, thus reinforcing the synergy effect.

According to an embodiment of the present invention, the camera is a lane-keeping camera that is designed to detect a driving lane marking during operation of the motor vehicle. This advantageously results in a particularly high level of synergy, since there is no need for an additional camera for the lane-keeping assistance system.

Furthermore, the vehicle control system preferably includes a reversing camera for recording reversing images, wherein the accident data recorder is designed for buffered recording of the reversing images as well. In this way, in the event of a multiple-vehicle accident, it is possible to determine whether the relevant motor vehicle itself had driven into a preceding vehicle or had been pushed into the preceding vehicle by a vehicle behind it. It is also possible to use the reversing images in order to determine criteria for autonomous braking.

In order to obtain as comprehensive an image as possible of the accident scenario, and in order to allow the vehicle control system to be improved particularly easily, one embodiment of the present invention provides that a distance sensor is arranged on the motor vehicle and is designed for detection of distance data relating to the distance to a preceding vehicle, and that the accident data recorder is designed for buffered recording of the distance data. In this case, the electronic controller is designed to detect distance and yaw-rate sensor data as driving data. The distance and yaw-rate sensor data are therefore taken into account in the assessment as to whether autonomous braking should be carried out. This therefore results in a synergy, since the distance and yaw-rate sensors need be provided only once.

Furthermore, the vehicle control system can include a distance determining camera that is arranged such that a distance and a relative speed with respect to a preceding vehicle can be determined from the images recorded by it. In particular, the distance determining camera can be arranged such that the rear of the preceding vehicle is in its field of view.

Preferably, the vehicle control system further includes an acceleration sensor and/or a yaw-rate sensor and/or a steering-angle sensor, wherein the accident data recorder is designed to also record, in a buffered form, data received from these sensors. All the received data are in this case recorded such that they can be reconstructed in time sequence. Furthermore, the electronic controller is designed to detect acceleration sensor data and/or yaw-rate sensor data and/or steering-angle sensor as driving data, and to use this data to decide whether autonomous braking should be carried out.

Advantageously, the accident data recorder can be designed to store about 0.1 to 100 images per second. It is also possible to compress the images before storage, in order to save memory space. Suitable compression methods are known.

The vehicle control system is preferably equipped with:

(a) a lane-keeping assistance system that includes:
- a lane-keeping camera designed to detect a driving lane marking on a roadway during operation of the motor vehicle, and
- an electrical assistance system controller designed to output a lane-keeping signal on leaving the driving lane during operation of the motor vehicle; and/or (b) a distance assistance system that includes:
- a distance sensor for detection of a distance of the motor vehicle with respect to a preceding vehicle, and
- an electrical distance assistance controller designed to output a distance signal when a predetermined minimum distance from the preceding vehicle is undershot during operation of the motor vehicle, or when a collision-critical situation occurs in which the driver has to apply a predetermined braking deceleration to avoid driving into the preceding vehicle; and (c) an emergency braking system that includes an electrical emergency braking system controller designed for autonomous braking of the motor vehicle, wherein the electrical emergency braking system controller is connected to the lane-keeping camera and to the distance sensor such that they allow redundant detection of the preceding vehicle.

The images produced by the specified cameras can thus, on the one hand, be used for an assistance system and furthermore can be stored in a buffered form in the accident data recorder. Instead of providing the entire surrounding-area sensor system in the motor vehicle in a duplicated form, in order to produce the required redundancy, the information from surrounding-area sensors, which is intended for the accident data recorder or for an automatic driver assistance system (e.g., adaptive cruise control, ACC), is thus advantageously used to represent the redundancy required for the emergency braking function. The electronic controller is preferably designed, on the one hand, to produce data relating to the lane position and lane radius from the recorded images, and, on the other hand, to provide data relating to the position of lateral objects, and their width. The electronic controller is also designed to combine the data obtained in this way with existing, unchanged data from driving sensors of the driver assistance system in order to obtain redundantly protected, refined object data for the emergency braking system.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

Embodiments of the present invention will be discussed in greater detail hereinafter with reference to the attached drawing, in which:

FIG. 1 is a schematic diagram of a motor vehicle equipped with a control system according to an embodiment of the invention.

DETAILED DESCRIPTION OF THE PREFERRED EMBODIMENTS

FIG. 1 shows a motor vehicle 10 in the form of a schematically indicated bus, viewed from above, which is designed to drive on a roadway 12. Roadway 12 has a driving lane marking in the form of a carriageway marking 14 and a carriageway boundary marking 16.

At the front 18, motor vehicle 10 has a driving data sensor 20 in the form of a distance sensor, which determines a distance A and a relative speed DV with respect to a preceding vehicle 22. Motor vehicle 10 has a lane-keeping camera 24 in the center of the front of the vehicle, preferably arranged on the windshield, which lane-keeping camera 24 detects carriageway marking 14 and carriageway boundary marking 16 in a lane-keeping camera field of view G. Lane-keeping camera 24 is arranged such that the lane-keeping camera field of view G furthermore at least partially covers preceding vehicle 22.

Lane-keeping camera 24 and driving data sensor 20 are connected to an electronic controller 26. Electronic controller 26 can evaluate images received from lane-keeping camera 24 at a frequency of about 10 to 50 images per second, and uses an algorithm programmed in it to determine whether motor vehicle 10 is approaching or crossing over carriageway boundary marking 16 in an impermissible manner. If this is the case, a lane-keeping signal is output to a driver of motor vehicle 10, providing the driver with a warning. If electronic controller 26 identifies a situation with greater than a predetermined threshold probability of leading to an accident, then electronic controller 26 activates wheel brakes of vehicle 10, and thus brakes it even without any further action by the driver, in order to avoid the threatened accident, or to reduce its consequences.

At regular time intervals, driving data sensor 20 detects the distance A and the relative speed DV with respect to preceding vehicle 22, and likewise sends this measurement data to electronic controller 26. If a collision-critical situation is identified on the basis of the movement of motor vehicle 10 itself and the distance and relative speed data relating to preceding vehicle 22, then electronic controller 26 likewise outputs a warning signal to the driver. For example, a critical situation such as this can occur when the deceleration to be applied by the driver after anticipated reaction time exceeds a predetermined threshold value. Electronic controller 26 writes all, or a predetermined selection, of the data received from driving data sensor 20 or lane-keeping camera 26 to an accident data recorder 28. It is thus possible for every received measured value to be stored in accident data recorder 28. However, it is also possible for every nth measured value to be stored, for example every fifth or tenth measured value.

Accident data recorder 28 records the received measurement data in a buffered form, which means that measurement data older than a predetermined storage time T, which depends on the storage capacity of the accident data recorder and, for example, can be 20 seconds, are automatically erased. In the event of an accident involving motor vehicle 10, which is detected for example by a deceleration sensor 29, no more data can be erased. The accident sequence can then be reconstructed from the data recorded prior to that time in accident data recorder 28.

Furthermore, motor vehicle 10 has a reversing camera 30, which has a reversing camera field of view R. Reversing camera 30 is likewise connected to electronic controller 26, or directly to accident data recorder 28.

Furthermore, motor vehicle 10 has a yaw-rate sensor 32 and/or a steering-angle sensor 34, which are likewise connected to electronic controller 26 and whose data are likewise recorded by accident data recorder 28. Steering-angle sensor 34 detects a steering angle of a steering wheel, which is not shown.

A method for operation of a motor vehicle equipped with the control system according to embodiments of the present invention can include the steps of detecting driving data, detecting surrounding-area images, effecting buffered recording of the surrounding-area images in the accident data recorder, determining whether the driving data and/or surrounding-area images present a threshold likelihood of a collision, and initiating autonomous braking of the motor vehicle based on the results of that determination.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A vehicle control system for a motor vehicle, comprising:

driving data sensors configured to detect driving data that represent a driving state of the motor vehicle, the driving data sensors comprising:

a distance sensor configured to detect a distance and a relative speed of the motor vehicle with respect to a preceding vehicle; and a yaw-rate sensor;

at least one camera configured to detect surrounding-area images;

an accident data recorder for buffered recording of the surrounding-area images; and an electronic controller configured to:

control the driving data sensors, the at least one camera and the accident data recorder;

determine the detected distance and yaw rate sensor data as the driving data; and initiate autonomous braking of the motor vehicle when the detected distance, relative speed, yaw rate sensor data, and surrounding-area images indicate a predetermined threshold probability of an accident.

2. The vehicle control system as claimed in claim 1, wherein the at least one camera includes a lane-keeping camera that detects a driving lane marking during operation of the motor vehicle.

3. The vehicle control system as claimed in claim 1, wherein the at least one camera includes a reversing camera that records reversing images, and wherein the accident data recorder is configured to effect buffered recording of the reversing images.

4. The vehicle control system as claimed in claim 1, wherein:

the accident data recorder is configured to effect buffered recording of the detected distance.

5. The vehicle control system as claimed in claim 1, wherein the driving data sensors further comprise an acceleration sensor and a steering-angle sensor, wherein the accident data recorder is configured to effect buffered recording of acceleration sensor data and steering-angle sensor data produced by the acceleration sensor and steering-angle sensor, and wherein the electronic controller is further configured to determine at least one of the acceleration sensor data and steering-angle sensor data as the driving data.

6. The vehicle control system as claimed in claim 1, wherein the accident data recorder is configured to store about 0.1 to 100 images per second.

7. A motor vehicle, comprising a vehicle control system as claimed in claim 1, further comprising at least one of:

(a) a lane-keeping assistance system including a lane-keeping camera configured to detect a driving lane marking on a roadway during operation of the motor vehicle, and an electrical assistance system controller configured to output a lane-keeping signal on leaving the driving lane during operation of the motor vehicle;

(b) a distance assistance system including the distance sensor; and an electronic distance assistance controller adapted to output a distance warning signal when a predetermined minimum distance from the preceding vehicle is undershot during operation of the motor vehicle; and (c) an emergency braking system including an emergency braking system controller configured to autonomously brake the motor vehicle, the emergency braking system controller being connected to the lane-keeping camera and to the distance sensor to enable redundant detection of the preceding vehicle.

8. The motor vehicle as claimed in claim 7, wherein the motor vehicle is one of a bus and a truck.

9. A method for operating a motor vehicle, comprising the steps of:

detecting driving data using at least one driving data sensor, the driving data including a distance and a relative speed of the motor vehicle with respect to a preceding vehicle, and a yaw rate of the motor vehicle;

detecting surrounding-area images using at least one camera;

effecting buffered recording of the surrounding-area images in an accident data recorder;

determining with at least one processor whether the driving data and surrounding-area images indicate a predetermined threshold probability of an accident; and initiating autonomous braking of the motor vehicle when the driving data and surrounding-area images indicate a predetermined threshold probability of an accident.

10. The method as claimed in claim 9, further comprising the steps of:

detecting reversing camera images from a reversing camera mounted at the rear of the motor vehicle; and effecting buffered recording of the reversing camera images using the accident data recorder.

* * * * *